(12) United States Patent
Bae

(10) Patent No.: US 12,367,629 B2
(45) Date of Patent: Jul. 22, 2025

(54) METHOD FOR ANALYZING PERSONALITY OR APTITUDE BASED ON METAVERSE AND ARTIFICIAL INTELLIGENCE

(71) Applicant: Young Sik Bae, Seoul (KR)

(72) Inventor: Young Sik Bae, Seoul (KR)

(73) Assignee: WHOBORN INC., Seoul (KR)

( * ) Notice: Subject to any disclaimer, the term of this patent is extended or adjusted under 35 U.S.C. 154(b) by 81 days.

(21) Appl. No.: 17/986,712

(22) Filed: Nov. 14, 2022

(65) Prior Publication Data

US 2023/0154093 A1    May 18, 2023

(30) Foreign Application Priority Data

Nov. 15, 2021   (KR) .......................... 10-2021-0156521
Dec. 24, 2021   (KR) .......................... 10-2021-0187245
Sep. 5, 2022    (KR) .......................... 10-2022-0112115

(51) Int. Cl.
*G06T 13/40*      (2011.01)
*G06T 19/00*      (2011.01)
*G06V 40/16*      (2022.01)

(52) U.S. Cl.
CPC ............ *G06T 13/40* (2013.01); *G06T 19/006* (2013.01); *G06V 40/174* (2022.01)

(58) Field of Classification Search
None
See application file for complete search history.

(56) References Cited

U.S. PATENT DOCUMENTS

| | | | |
|---|---|---|---|
| 2006/0187305 A1* | 8/2006 | Trivedi | G06T 3/047 348/169 |
| 2009/0044113 A1* | 2/2009 | Jones | G06T 13/40 715/707 |
| 2010/0083112 A1* | 4/2010 | Dawson | G06Q 10/00 715/706 |
| 2011/0007079 A1* | 1/2011 | Perez | A63F 13/56 345/473 |
| 2015/0040036 A1* | 2/2015 | Crocker | G06F 3/04815 715/757 |
| 2015/0242707 A1* | 8/2015 | Wilf | G06F 18/2413 382/159 |
| 2018/0218309 A1* | 8/2018 | Keen | A61B 5/167 |
| 2021/0027759 A1* | 1/2021 | Ogawa | G10L 13/02 |
| 2021/0279962 A1* | 9/2021 | Hutten | G06T 19/006 |
| 2023/0014321 A1* | 1/2023 | Nair | A63F 13/75 |

* cited by examiner

*Primary Examiner* — Anh-Tuan V Nguyen
(74) *Attorney, Agent, or Firm* — Columbia IP Law

(57) ABSTRACT

There is disclosed a method for analyzing personality or aptitude based on a metaverse and artificial intelligence that is performed in a personality or aptitude analysis system, the method including acquiring at least one of voice information, visual information, and biometric information for a user, analyzing personality or aptitude of the user by using at least one of the voice information, visual information, and biometric information, generating data for each user including a result of analyzing the personality or aptitude of the user, and creating an avatar of the user by using the data for each user.

11 Claims, 6 Drawing Sheets

METHOD FOR ANALYZING PERSONALITY OR APTITUDE BASED ON METAVERSE AND ARTIFICIAL INTELLIGENCE

CROSS-REFERENCE TO RELATED APPLICATION

This application claims priority to Korean Patent Application No. KR10-2022-0112115 filed on Sep. 5, 2022, Korean Patent Application No. KR10-2021-0187245 filed on Dec. 24, 2021, and Korean Patent Application No. KR10-2021-0156521 filed on Nov. 15, 2021 and all the benefits accruing therefrom under 35 U.S.C. § 119, the contents of which are incorporated by reference in their entirety for all purposes.

BACKGROUND

The present disclosure relates to a method for analyzing personality or aptitude, and more particularly, to a method for analyzing personality or aptitude based on metaverse and artificial intelligence.

The metaverse is a compound word of "meta", meaning virtual and transcendence, and "universe", meaning the world and cosmos, and refers to a virtual world where real life and legally recognized activities such as work, finance, and learning are connected in three dimensions (3D). That is, the metaverse is a concept that has evolved one step further than virtual reality (VR), and has the feature of being able to engage in social and cultural activities similar to those in real reality, not just enjoying games or virtual reality using avatars.

Acceleration Studies Foundation (ASF), a non-profit technology research group, classifies metaverse into four types: augmented reality, life logging, mirror worlds, and virtual worlds.

Augmented reality refers to an environment that interacts through virtual superimposed objects expressed in two dimensions (2D) or 3D in real space. Augmented reality has the characteristics of reducing people's rejection of the virtual world and increasing the sense of immersion. An example of augmented reality is a scene where a digitally constructed building of the past is displayed on a terminal of a user in a superimposed manner when the user takes a picture of the traces that currently remains only as ruins with a terminal camera.

Lifelogging is the art of capturing, storing, and depicting everyday experiences and information about objects and people. A user can capture every moment in his or her daily life as text, video, sound, or the like, store and organize the content on the server, organize, and share the organized content with other users. An example of a daily life record is to store and share information such as distance covered, calories burned, and music selection by linking sportswear with sensors to an MP3 player capable of connecting to a network.

The mirror world refers to a virtual world that reflects the real world as realistically as possible and as it is, but is expanded informationally. A typical example is Google Earth. Google Earth collects all satellite photographs from all over the world and updates the photographs at regular intervals, reflecting the ever-changing real world as it is. As technology continues to develop, the mirror world that reflects reality will become closer to the real world, which will become a major immersive element of virtual reality in the future. Users of the mirror world obtain information about the real world by viewing the virtual world.

The virtual world is one built by digital data for an alternative world similar to reality or completely different. In the virtual world, users perform activities similar to economic and social activities in the real world through avatars. The virtual world is the most familiar form of metaverse, and a concept that collectively refers to a community implemented in a 3D computer graphic environment from online role-playing games to living virtual worlds such as SANDBOX, ZEPETO, and Roblox.

Examples of the related art include Korean Patent Laid-Open Publication No. 10-2019-0108523 (Sep. 24, 2019).

SUMMARY

Since the personality or aptitude test is conducted on people in real life, it is difficult to conduct the test easily unless the participant does the testing face-to-face. Therefore, there is a need for a method that can perform a personality or aptitude test relatively simply based on the metaverse.

The present disclosure provides a method for analyzing personality or aptitude based on a metaverse and artificial intelligence, capable of generating user data by acquiring voice information and/or visual information for a user and analyzing personality or aptitude of the user by using artificial intelligence, and creating an avatar of the user who are active in the metaverse using the user data.

The present disclosure also provides a method for analyzing personality or aptitude based on a metaverse and artificial intelligence capable of updating the personality or aptitude in real time depending on the words or actions of an avatar created using initial user data in the metaverse.

The present disclosure further provides a method for analyzing personality or aptitude based on a metaverse and artificial intelligence capable of being utilized in various fields, such as a career, learning, communication, corporate HR/recruitment, travel recommendation, or product recommendation, through an avatar reflecting personality or aptitude of a user.

However, the present disclosure is not limited thereto, and may be various modifications and changes can be made without departing from the spirit and scope of the present disclosure.

In accordance with an exemplary embodiment of the present invention, there is provide a method for analyzing personality or aptitude based on a metaverse and artificial intelligence that is performed in a personality or aptitude analysis system, the method including acquiring at least one of voice information, visual information, and biometric information such as brain waves and DNA, for a user, analyzing personality or aptitude of the user by using at least one of the voice information, visual information, and biometric information such as brain waves and DNA, generating data for each user including a result of analyzing the personality or aptitude of the user, and creating an avatar of the user by using the data for each user.

The analyzing of the personality or aptitude of the user may include analyzing the voice information, predicting the personality or aptitude of the user based on an analysis result of the voice information, and recommending the personality or aptitude of the user based on the prediction.

The analyzing of the voice information may include removing noise from the voice information to normalize the voice information, generating voice data to be markable on a timeline based on the voice information, and generating a voice style including at least one of a tempo, an idle time, a tone, and a volume based on the voice information.

The predicting of the personality or aptitude of the user based on the analysis result of the voice information may include predicting the personality or aptitude of the user based on the voice data, and the personality or aptitude of the user may be predicted by a first engine trained with training voice data classified for each personality or aptitude type, by using the voice data as an input.

The predicting of the personality or aptitude of the user based on the analysis result of the voice information may include predicting the personality or aptitude of the user based on the voice style, and the personality or aptitude of the user may be predicted by a second engine trained with a training voice style classified for each personality or aptitude type, by using, as an input, an average value of the voice style for a specific part that is easy to read.

The predicting of the personality of the user based on the analysis result of the voice information may include predicting the personality or aptitude of the user based on the voice style, and the personality or aptitude of the user may be predicted by a third engine trained with marking specific data or continuous pattern data in a marking section, by using, as an input, the voice style marked in regular time intervals.

The predicting of the personality of the user based on the analysis result of the voice information may include predicting the personality or aptitude of the user based on the voice data and the voice style, and the personality or aptitude of the user may be predicted by statistically processing a result predicted based on the voice data and a result predicted based on the voice style.

The analyzing of the personality or aptitude may include analyzing the visual information, predicting the personality or aptitude of the user based on an analysis result of the visual information, and recommending the personality or aptitude of the user based on the prediction.

The analyzing of the visual information may include recognizing a face of the user in the visual information to crop the face of the user, generating face data to be markable on a timeline as one scene of a specific image or an entirety of the specific image based on the visual information, and generating a face style including at least one of a shape and size of the face, a shape and position of eyes, a shape and position of a nose, a shape and position of a mouse, a shape and position of ears, a shape and position of eyebrows, a facial expression, and a hairstyle, based on the visual information.

The predicting of the personality or aptitude of the user based on the analysis result of the visual information may include predicting the personality or aptitude of the user based on the face data, and the personality or aptitude of the user may be predicted by a fourth engine trained with training face data classified for each personality or aptitude type, by using the face data as an input.

The predicting of the personality or aptitude of the user based on an analysis result of the visual information may include predicting the personality or aptitude of the user based on the voice style, and the personality or aptitude of the user may be predicted by a fifth engine trained with a training face style classified for each personality or aptitude type, by using, as an input, a 2D or 3D face pattern generated based on the face style in the one scene of the specific image that is easy to read.

The predicting of the personality or aptitude of the user based on an analysis result of the visual information may include predicting the personality or aptitude of the user based on the voice style, and the personality or aptitude of the user may be predicted by a sixth engine trained with a training face style classified for each personality or aptitude type, by using, as an input, a 2D or 3D face pattern generated based on the face style marked by time for the entirety of the specific image.

The predicting of the personality or aptitude of the user based on an analysis result of the visual information may include predicting the personality or aptitude of the user based on the face data and the face style, and the personality or aptitude of the user may be predicted by statistically processing a result predicted based on the face data and a result predicted based on the face style.

The analyzing of the personality or aptitude may include analyzing the biometric information, predicting the personality or aptitude of the user based on an analysis result of the biometric information, and recommending the personality or aptitude of the user based on the prediction.

The analyzing of the biometric information may include analyzing brain waves by acquiring and analyzing brain waves responding to various stimuli of at least one of sight, hearing, taste, touch, and smell for a specific period of time, and analyzing DNA information by making comparison with a data information map in which characteristics of each DNA element and structure are analyzed to analyze unique DNA information.

The predicting of the personality or aptitude of the user based on the analysis result of the biometric information may include predicting the personality or aptitude by making comparison with results predicted through accumulated biometric analysis.

The recommending of the personality or aptitude of the user based on the prediction of the personality or aptitude may include guiding a final recommended personality or aptitude by singly or integrally analyzing the result of the personality or aptitude predicted through one or more analyzes and asking whether to apply the final recommended personality or aptitude when creating an avatar. The method may further include updating the user data including the result of analyzing the personality or aptitude of the user in real time or periodically by reflecting an action, a conversation, words, or writing of the created avatar in the metaverse.

The method may further include analyzing at least one of interests and tendencies of the user using the avatar in consideration of words, a conversation, or writing used by the created avatar, and an action of the avatar in the metaverse together, from a perspective of multimodal behavior patterns, the action including movement of hands, a head, and a gaze of the avatar.

The created avatar may have artificial intelligence properties, may act autonomously without user access, and may be operated by interacting with other avatars. Furthermore, depending on the conditions, the avatar may be moved to another place, may be replicated, and may be used for various experiments or metaverse (virtualization, digital twinization) composition.

DETAILED DESCRIPTION OF EMBODIMENTS

Figure 1:
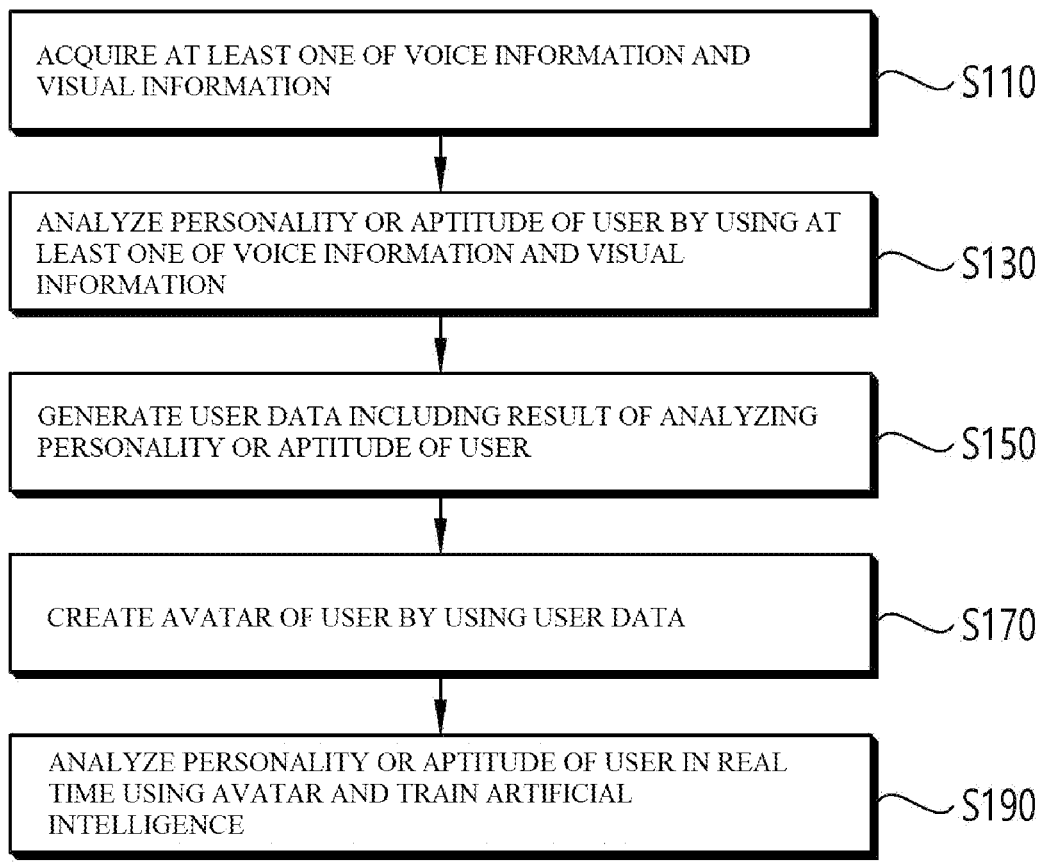
FIG. 1 is a flowchart of a method for analyzing personality or aptitude based on a metaverse and artificial intelligence in accordance with an exemplary embodiment of the present disclosure.

It is to be understood that the present disclosure may be variously modified and embodied, and thus particular embodiments thereof will be illustrated in the drawings and described in detail.

However, this is not intended to limit the present disclosure to the specific embodiments, it should be understood to include all modifications, equivalents, and substitutes included in the spirit and scope of the present invention.

Further, it will be understood that, although the terms first, second, etc. may be used herein to describe various elements, these elements should not be limited by these terms. These terms are only used to distinguish one element from another element. For example, without departing from the scope of the present disclosure, a first element could be termed a second element, and similarly, a second element could be termed a first element.

It will be understood that when an element is referred to as being "coupled" or "connected" to another element, the element may be directly coupled or connected to the other element, or intervening elements may also be present. In contrast, it will be understood that when an element is referred to as being "directly coupled" or "directly connected" to another element, there are not intervening elements present.

The terms used in the present application are merely provided to describe specific embodiments, and are not intended to limit the present disclosure. The singular forms, "a", "an", and "the" are intended to include the plural forms as well, unless the context clearly indicates otherwise. In the present application, it will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein, including technical or scientific terms, have the same meaning as commonly understood by those of ordinary skill in the art to which the embodiments of the present invention pertain. Terms, such as those defined in commonly used dictionaries, should be interpreted as having a meaning that is consistent with their meaning in the context of the related art and will not be interpreted in an idealized or overly formal sense unless expressly so defined herein.

Hereinafter, with reference to the accompanying drawings, preferred exemplary embodiments of the present disclosure will be described clearly and in detail so that those of ordinary skill in the art to which the present disclosure pertains can easily practice the present disclosure.

FIG. 1 is a flowchart of a method for analyzing personality or aptitude based on a metaverse and artificial intelligence, which is performed in a personality or aptitude analysis system in accordance with an exemplary embodiment of the present disclosure.

Referring to FIG. 1, in the personality or aptitude analysis system, at least one of voice information and visual information is acquired in step S110. The voice information may be acquired by voice recognition technology based on ontology (natural language machine learning), and the visual information may include information that may be determined by sight without limitation, such as text information such as a writing style of a user or the model name displayed on an object the user is holding, facial information such as the appearance and facial expression of the user and appearance changes between normal and difficult activities, user gesture information, object information such as clothes the user is wearing, and the like. In the acquiring, in addition to voice information and visual information, various information including biometric information such as brain waves and DNA that is possible to be acquired by using an appropriate sensor may be further used. Conversations exchanged, recorded information, and patterns may also be used as analysis and learning information.

In the personality or aptitude analysis system, in step S130, as a simple sorting-out step for the personality or aptitude of the user, the personality or aptitude of the user is analyzed using at least one of the voice information, the visual information, and the biometric information. Specifically, at least one of the voice information, visual information, and biometric information for the user may be analyzed, and the personality or aptitude of the user may be primarily analyzed using the analyzed data. The biometric information may be analyzed by acquiring brain waves responding to at least one stimulus among sight, hearing, taste, touch, and smell for a specific period of time and performing the brain wave analysis. In addition, in the analysis of the biometric information, unique DNA information may be analyzed by comparing the biometric information with a data information map in which characteristics of each DNA element and structure are analyzed. For the biometric information, it is possible to predict the personality or aptitude of the user by comparing and analyzing results predicted through the accumulated biometric analysis.

In the personality or aptitude analysis system, the personality or aptitude of the user primarily analyzed in step S130, and the personality or aptitude of the user may be recommended based on the primary personality or aptitude data. For example, in the case of the generating of the primary personality or aptitude data, the occupation or personality or aptitude of the user may be analyzed in the physiognomic aspect through artificial intelligence learning. That is, by using the artificial intelligence trained on the face or voice of the user, from information on the voice or face of the user, the occupation of the user may be analyzed as a president or an athlete, and the primary personality or aptitude data for the personality or aptitude may be analyzed. The primary personality or aptitude data may be updated depending on future actions or words of an avatar of the user to generate secondary personality or aptitude data.

In the personality or aptitude analysis system, in step S150, user data including an analysis result of the personality or aptitude of the user n the simple sorting-out step is generated. The user data may include, for example, a user's ID, password, and data for analysis result of the personality or aptitude. The user data may include data obtained by analyzing the voice or a face image of the user, rather than voice data and face image data of the user itself.

Here, the user data is the user-specific data for the user temporarily acquired in the step prior to generating the secondary personality or aptitude data obtained by analysis based on the actions or words of the avatar. Here, the user data may be updated on a timeline. For example, in the simple sorting-out step for the personality or aptitude of the user, data analyzed in the physiognomic aspect such as the voice or face of the user may be updated while the personality or aptitude data is continuously being updated on a timeline.

In the personality or aptitude analysis system, in step S170, the avatar of the user is created using user data. The appearance or attire of the avatar may be determined according to the user data, and the user may live in the metaverse through the created avatar.

In the personality or aptitude analysis system, in step S190, the personality or aptitude of the user is analyzed in real time using the avatar, and artificial intelligence is trained. That is, the personality or aptitude of the user analyzed by artificial intelligence in step S130 is not fixed. Initial data may be generated by simply sorting out the personality or aptitude of the user based on minimal voice information and/or visual information, and then, the personality or aptitude data for the user may be updated in real time or periodically by reflecting the actions or words of the avatar of the user in the metaverse.

As an example of reflecting the action of the avatar, the personality or aptitude data for the user may be updated depending on the action of the user, for example, whether the avatar runs or walks to a specific place. As another example, the personality or aptitude data for the user may be updated depending on, when the avatar moves to a specific place, whether the avatar moves to the specific place through a straight path or moves to the specific place through a detour path.

As an example of reflecting the words of the avatar, a word (subject, object, adverb, postposition, verb) that is used periodically or repeatedly in the words, conversation, or writing used by the avatar may be extracted through a redundancy check, and then interests and tendencies of the user using the avatar may be analyzed.

From the perspective of multimodal behavior patterns, the interests and tendencies of users using the avatar may be analyzed in consideration of words, conversations, or writing used by the avatar and the action (movement of the hands, the head, and the gaze) of the avatar together. For example, when the hand or head of the avatar is shaken or moved more actively in a specific word used by the avatar, interests and tendencies of the user using the avatar may be analyzed in consideration of whether the gaze of the avatar moves to a specific position or specific target within the virtual space, whether the gaze stops, the duration of a specific action, and so on.

Meanwhile, since the personality or aptitude data is updated using actions or words of the avatar rather than actions or words of the user, when the user wants to know his or her real personality or aptitude, the user may act or speak in the same way as he or she actually acts or speaks within the metaverse. On the other hand, in order to create an avatar having the personality or aptitude desired by the user, the user may act or speak in the metaverse differently from what he or she normally acts or speaks, and by reflecting the actions or words, the user may update the personality or aptitude as the user desires.

A communication service may be provided through a method such as matching with other users with a personality or aptitude similar to that of the user in the metaverse through analyzed user data or the avatar of the user, or matching with other users with a personality or aptitude opposite to that of the user.

In addition, a personality or aptitude test may be conducted as part of a hiring process of a company through the analyzed user data or the avatar of the user. For example, after setting up a work environment in a company and configuring the metaverse according to the setting, it is possible to check whether the avatar of the user is able to perform work while adapting well to the work environment set by the company. For example, when the work environment of the company where the user's avatar works is changed from a large space to a narrow space (e.g., a crowded space or a space with no light), a check whether or not the work progress of the user is reduced may be made. Alternatively, when the department of the avatar of the user with a role of developer in a company is changed to a sales department instead of a development department, a job adaptation degree of the user may be checked.

In addition, for a new recruit, for example, verification of the effectiveness of recruitment may be done by simulating the behavior of an artificially intelligent avatar reflecting the personality or aptitude of the new recruit in a virtual work environment.

In addition, for a new recruit, for example, verification of the effectiveness of recruitment may be done by evaluating the performance of the new recruit in terms of personnel evaluation when the avatar of the new recruit performs tasks in the metaverse for each department in a company.

In addition, for example, verification of the effectiveness of a new project to see what kind of synergistic effect it has may be done by putting avatars of existing staffs in the company and a new recruit into a virtual team to carry out the project in the metaverse space.

Compared to the case of taking a personality or aptitude test or the hiring process in reality, the user does not have to go to the test directly, which makes it possible to conduct an efficient personality or aptitude test or hiring process, which, in turn, can contribute to ESG (which stands for Environmental, Social and Governance) management from the company's point of view.

The user data analyzed when the avatar has been created is reflected, but whether or not to disclose the user data itself to others may be determined by a choice of the user.

The method for analyzing personality or aptitude in accordance with an exemplary embodiment of the present disclosure may be used not only to analyze the personality or aptitude of a user (that is, person) but also to analyze the aptitude of animals or things.

The aforementioned steps S130, S150, S170, and S190 may be performed by an artificial intelligence engine of the personality or aptitude analysis system, and detailed operations will be described later with reference to FIGS. 2 to 6.

Figure 2:
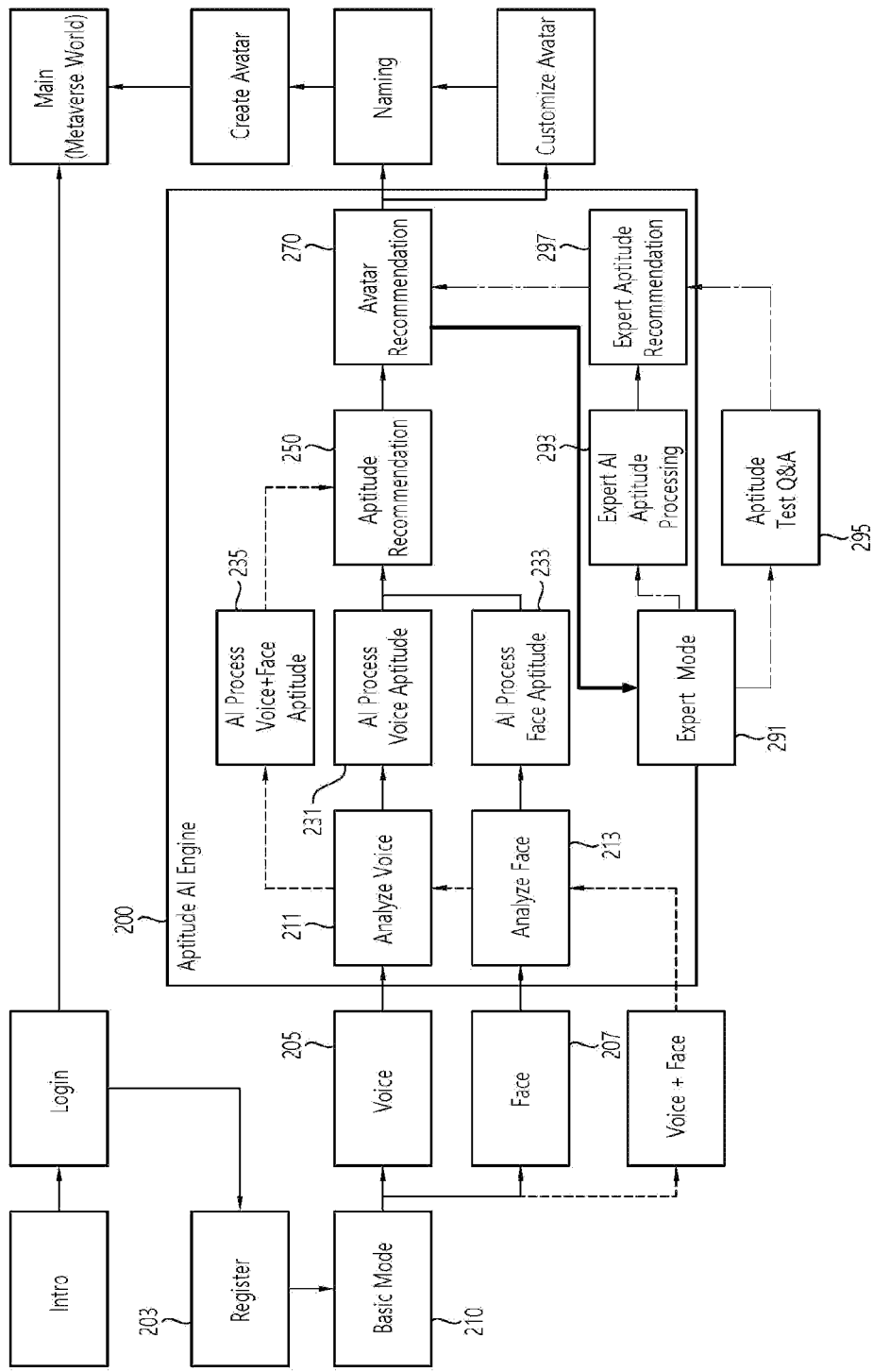
FIG. 2 schematically shows an overall process for creating an avatar in accordance with an exemplary embodiment of the present disclosure.

FIG. 2 schematically shows an overall process for creating an avatar in accordance with an exemplary embodiment of the present disclosure.

The method for analyzing personality or aptitude in accordance with an exemplary embodiment of the present disclosure may be serviced to a user as a metaverse personality or aptitude solution. The metaverse personality or aptitude solution may provide a personality or aptitude analysis service on the on-line basis when the user accesses it in real time, and may also provide the personality or aptitude analysis service off-line based on previously stored data when online access is not possible. Offline data may be synchronized with online data later on to reflect a result of offline analysis in online data.

The metaverse may be a virtual world copied from the real world, or may be a digital twin that works just like the real world. The metaverse may also be a world created by imagination or for a special purpose rather than reflecting reality as it is.

The user may access the metaverse space in various ways, such as accessing the metaverse space through VR equipment such as a head mounted display (HMD) or accessing the metaverse space through an application such as a smartphone or PC or a browser.

As shown in FIG. 2, when the user accesses the metaverse space and logs in, a registration process 203 for creating an avatar is performed. The registration process 203 may include a basic mode 210 and an expert mode 291, and in the basic mode 210, the avatar is created by simply sorting out the personality or aptitude using voice information 205 and/or face information 207, and in the expert mode 291, the personality or aptitude is analyzed more precisely by various tests such as the Strong's test, the MLST learning strategy test, the MBTI, the Enneagram personality or aptitude type test, and biometric information analysis (brain waves, DNA) as detailed tests. The expert mode is optional, and whether to perform may be determined according to a user's selection.

The personality or aptitude analysis may be performed by an artificial intelligence engine 200.

In the basic mode 210, voice information 205 and/or face information 207 is analyzed (211, 213), and personality or aptitude is analyzed by an artificial intelligence process (231, 233, 235), and as a result thereof, the personality or aptitude of the user is recommended (250), and an avatar is recommended (270). A detailed description will be given later.

In the expert mode 291, personality or aptitude is analyzed by an expert personality process (293), or personality or aptitude is analyzed through an actual personality or aptitude test (295), and personality or aptitude is recommended according to the result (297), and an avatar is recommended (270). A detailed description will be given later.

That is, the artificial intelligence engine 200 recommends an avatar after analyzing the personality or aptitude of the user by using the voice information 205 and/or the face information 207. The user may use the avatar recommended by the artificial intelligence engine 200 as it is (270), or customize the avatar.

When the avatar is created, the user enters the metaverse world and lives in the metaverse as his or her avatar.

Figure 3:
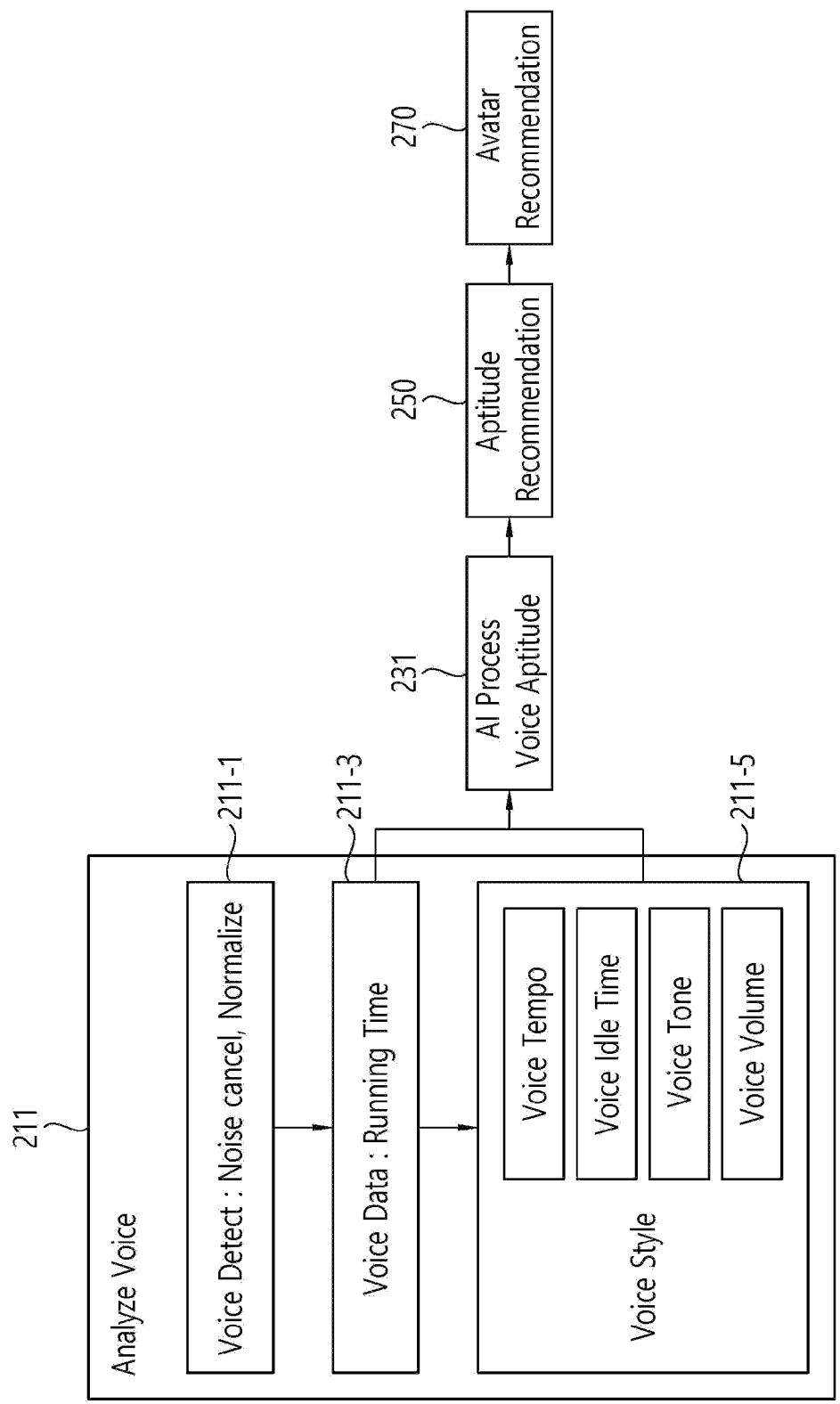
FIG. 3 shows a process of analyzing voice information in accordance with an exemplary embodiment of the present disclosure.

FIG. 3 shows a process of analyzing voice information in accordance with an exemplary embodiment of the present disclosure.

Referring to FIG. 3, first, noise canceling and normalization is performed from the voice information 205 (211-1). That is, other sounds other than the voice of the user are removed from the acquired voice information 205 and the voice section is corrected to the maximum level.

Next, based on the voice information 205, voice data 211-3 that is markable on a timeline are generated. The voice data is input data for personality or aptitude prediction, and may provide data that is markable on the timeline based on the length of the entire voice, and may be a part of a specific region of the voice information 205 or the entire region of the voice information 205. The voice data 211-3 that is markable on the timeline may be used, for example, to distinguish between a section in which the user speaks quickly, a section in which the user speaks slowly, or a section in which words are emphasized through speech pattern recognition. The voice data 211-3 that is markable on the timeline may be automatically analyzed and marked as to which voice pattern it corresponds to at which point in time, not manually. When a fast speech is turned into a slow speech, the section may be determined as the section in which words are emphasized. Further, even when a fast speech is turned into a slow speech, the section may not be a section in which words are emphasized, and thus, a determination may be made as to whether or not the section is the section in which the user emphasizes his or her words in consideration of whether the intonation or tone of the user rises, or the gaze of the user together.

From the perspective of multimodality, in a specific section on the timeline, not only the words of the user but also behavioral data such as the user's hand motion or the position of the gaze may be marked together on the timeline.

Next, based on the voice information 205, a voice style 211-5 including at least one of a voice tempo, a voice idle time, a tone, and a volume is generated. The voice style may be input data for predicting personality or aptitude or input data for predicting personality or aptitude in the form of marking on the timeline.

Figure 4:
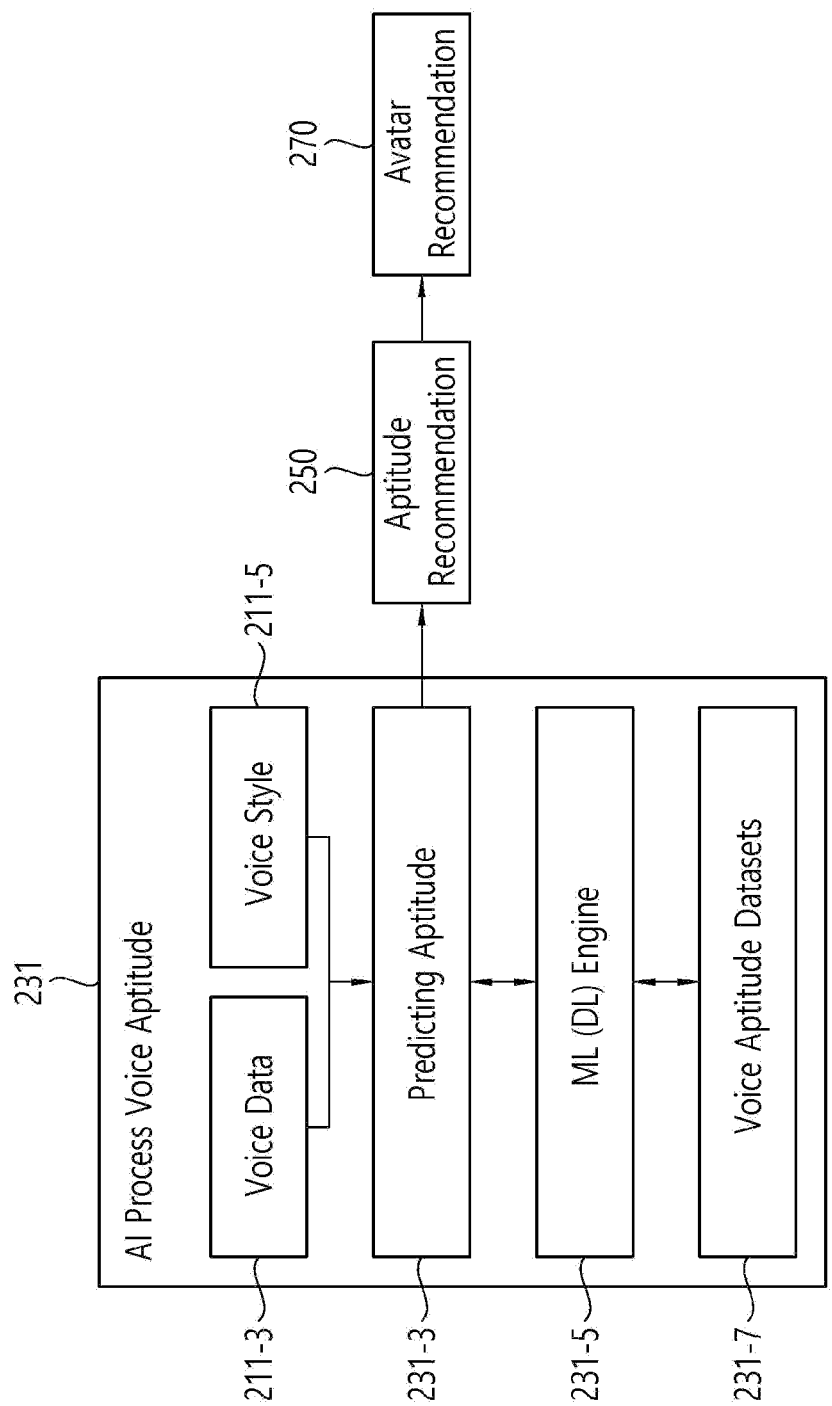
FIG. 4 shows a process of analyzing personality or aptitude using voice information in accordance with an exemplary embodiment of the present disclosure.

FIG. 4 shows a process of analyzing personality or aptitude using voice information in accordance with an exemplary embodiment of the present disclosure.

Referring to FIG. 4, the prediction (231-3) of personality or aptitude may be performed based on at least one of the voice data 211-3 and the voice style 211-5, and the personality or aptitude may be predicted (231-3) through the machine learning (or deep learning) engine 231-5 and training is performed in real time. Voice personality or aptitude datasets 231-7 include at least one of data in which the personality or aptitude is classified according to the voice data 211-3 and data in which the personality or aptitude is classified according to the voice style.

When the personality or aptitude of the user is predicted (231-3) based on the voice data 211-3, the personality or aptitude of the user may be predicted (231-3) by a first engine trained with training voice data classified for each personality or aptitude type, by using the voice data 211-3 as an input. For example, the similarity may be measured for each personality or aptitude type and a personality or aptitude with a high similarity may be predicted as a personality or aptitude result to be recommended to the user. The personality or aptitude of the user that has been predicted based on the voice data 211-3 is recommended to the user (250), and an avatar corresponding to the predicted personality or aptitude of the user is recommended (270).

When the personality or aptitude of the user is predicted (231-3) based on the voice style 211-5, the personality or aptitude of the user may be predicted (231-3) by a second engine trained with a training voice style 211-5 classified for each personality or aptitude type, by using, as an input, an average value of the voice style 211-5 for a specific part that is easy to read. For example, the similarity may be measured for each personality or aptitude type and a personality or aptitude with a high similarity may be predicted as a personality or aptitude result to be recommended to the user. The personality or aptitude of the user that has been predicted based on the voice style 211-5 is recommended to the user (250), and an avatar corresponding to the predicted personality or aptitude of the user is recommended (270).

As another method, when the personality or aptitude of the user is predicted (231-3) based on the voice style 211-5, the personality or aptitude of the user may be predicted (231-3) by a third engine trained with marking specific data or continuous pattern data in a marking section, by using, as an input, the voice style 211-5 marked in regular time intervals. For example, a personality or aptitude result to be recommended to the user may be predicted by measuring the similarity for each personality or aptitude type and statisticizing the measurement values of the all markings, or using a continuous pattern classification.

When the personality or aptitude of the user is predicted (231-3) based on both the voice data 211-3 and the voice style 211-5, the personality or aptitude to be finally recommended to the user may be predicted by statistically processing the result predicted by the first engine and the result predicted by the second engine, or the personality or aptitude to be finally recommended to the user may be predicted by statistically processing the result predicted by the first engine and the result predicted by the third engine.

Figure 5:
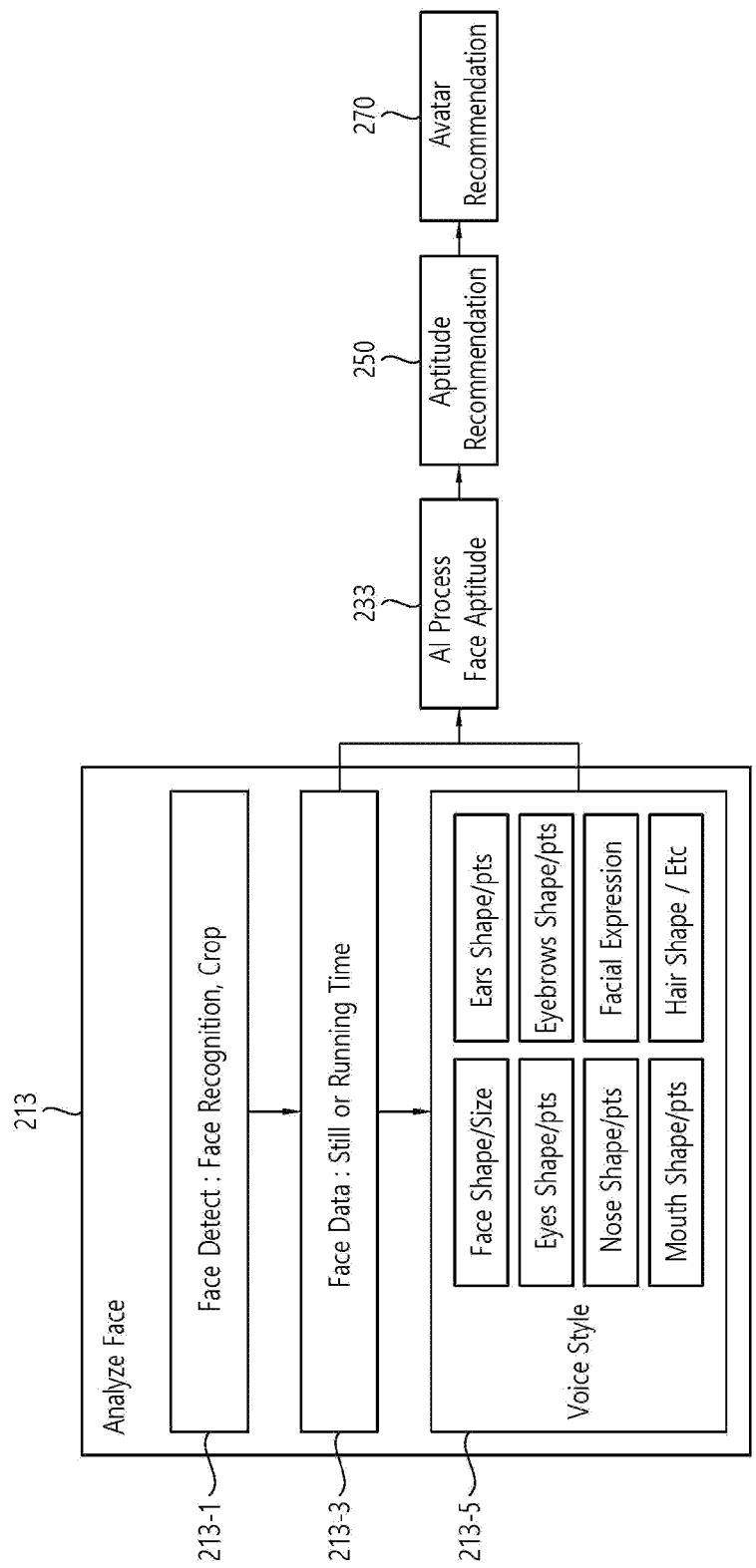
FIG. 5 shows a process of analyzing visual information in accordance with an exemplary embodiment of the present disclosure.

FIG. 5 shows a process of analyzing visual information in accordance with an exemplary embodiment of the present disclosure.

Referring to FIG. 5, first, a face 270 of the user is recognized in visual information (Face recognition) and the face 270 of the user is cropped. When there are two or more people in the visual information, anyone other than the target person may be deleted, and parts other than the face may also be deleted.

Next, based on the visual information, face data 213-3 that is markable on the timeline as one scene of a specific image (still) or the entirety of the specific image (video) is generated.

Next, based on the visual information, a face style 213-5 is generated that includes at least one of the shape and size of the face (Face Shape/Size), the shape and position of the eyes (Eyes Shape/pts), the shape and position of the nose (Nose Shape/pts), the shape and position of the mouth (Mouth Shape/pts), the shape and position of the ears (Ears Shape/pts), the shape and position of the eyebrows (Eyebrows Shape/pts), a facial expression (Facial Expression), and a hairstyle (Hair Shape). In addition, the face style may further include separately recognized information such as glasses, piercings, and beards. The face style may be input data for predicting personality or aptitude or input data for predicting personality or aptitude in the form of marking on the timeline.

Figure 6:
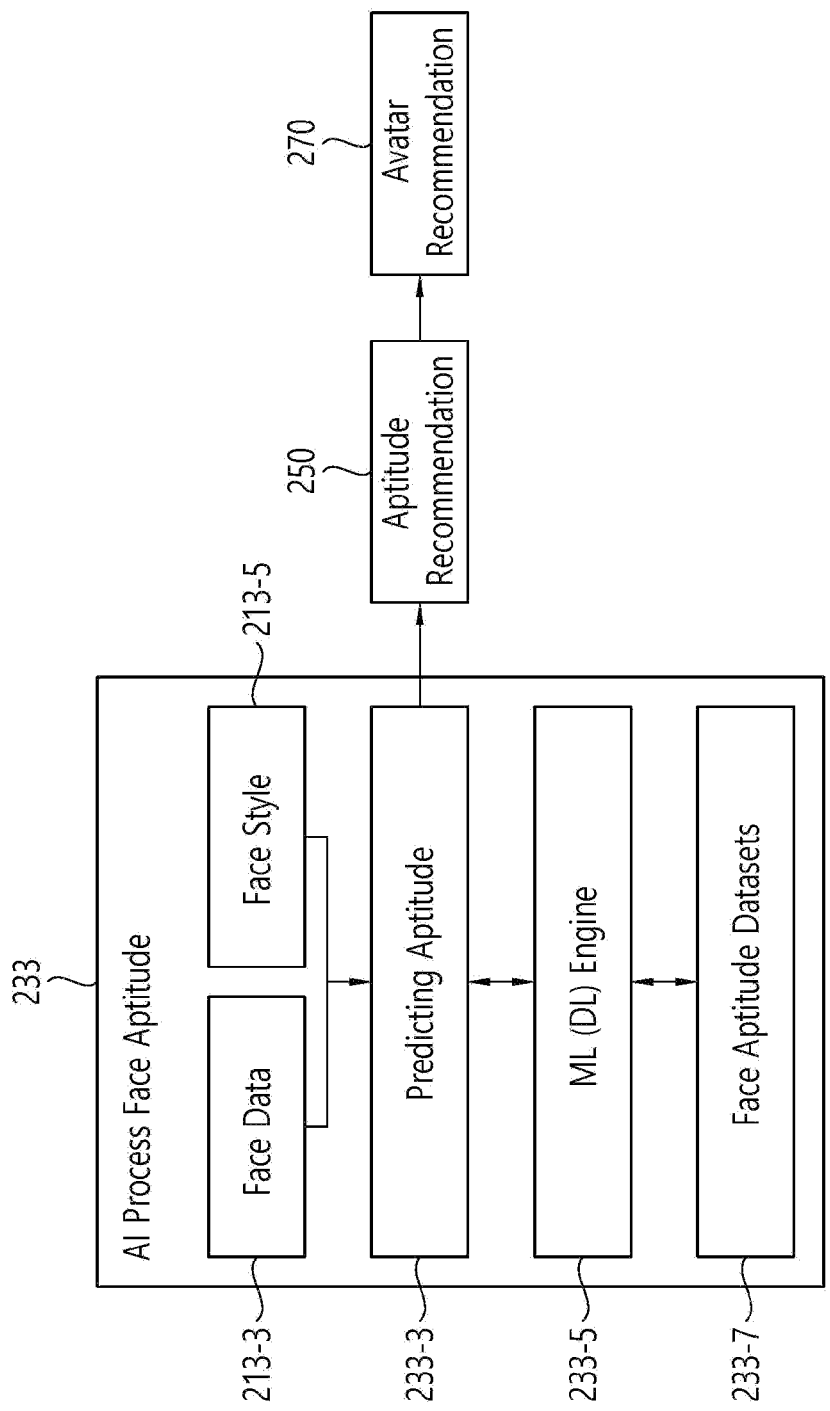
FIG. 6 shows a process of analyzing personality or aptitude using visual information in accordance with an exemplary embodiment of the present disclosure.

FIG. 6 shows a process of analyzing personality or aptitude using visual information in accordance with an exemplary embodiment of the present disclosure.

Referring to FIG. 6, the prediction of personality or aptitude may be performed based on at least one of the face data 213-3 and the face style 213-5, and the personality or aptitude may be predicted (233-3) through the machine learning (or deep learning) engine 233-5 and training may be performed in real time. Face personality or aptitude datasets 233-7 include at least one of data in which the personality or aptitude is classified according to the face data 213-3 and data in which the personality or aptitude is classified according to the voice style 211-5.

When the personality or aptitude of the user is predicted (233-3) based on the face data 213-3, the personality or aptitude of the user may be predicted by a fourth engine trained with training face data classified for each personality or aptitude type, by using the face data 213-3 as an input, and for example, similarity may be measured for each personality or aptitude type and the personality or aptitude with high similarity may be predicted as a personality or aptitude result to be recommended to the user. The personality or aptitude of the user that has been predicted based on the face data 213-3 is recommended to the user (250), and an avatar corresponding to the predicted personality or aptitude of the user is recommended (270).

When the personality or aptitude of the user is predicted (233-3) based on the face style 213-5, the personality or aptitude of the user may be predicted (233-3) by a fifth engine trained with a training face style classified for each personality or aptitude type, by using, as an input, a 2D or 3D face pattern generated based on the face style in the one scene of the specific image that is easy to read. For example, the similarity may be measured for each personality or aptitude type and a personality or aptitude with a high similarity may be predicted as a personality or aptitude result to be recommended to the user. The personality or aptitude of the user that has been predicted based on the face style 213-5 is recommended to the user (250), and an avatar corresponding to the predicted personality or aptitude of the user is recommended (270).

As another method, when the personality or aptitude of the user is predicted (233-3) based on the face style 213-5, the personality or aptitude of the user may be predicted (233-3) by a sixth engine trained with a training face style classified for each personality or aptitude type, by using, as an input, a 2D or 3D face pattern generated based on the face style marked by time for the entirety of the specific image. For example, a personality or aptitude result to be recommended to the user may be predicted by measuring the similarity for each marking and finally statisticizing the measured similarity.

When the personality or aptitude of the user is predicted (233-3) based on both the face data 213-3 and the face style 213-5, the personality or aptitude to be finally recommended to the user may be predicted by statistically processing the result predicted by the fourth engine and the result predicted by the fifth engine, or the personality or aptitude to be finally recommended to the user may be predicted by statistically processing the result predicted by the fourth engine and the result predicted by the sixth engine.

Although the present disclosure has been described with reference to the drawings and embodiments, it will be understood that the present disclosure should not be limited to the drawings and embodiments, and various changes and modifications to the present disclosure can be made by those of ordinary skilled in the art without departing from the spirit and scope of the present disclosure as hereinafter claimed.

The disclosed technology may have the following effects. However, this does not mean that a specific embodiment does not necessarily include all of the following effects or only the following effects, and thus it is not to be construed that the scope of the disclosed technology is not limited thereby.

According to the method for analyzing personality or aptitude based on a metaverse and artificial intelligence in accordance with exemplary embodiments of the present disclosure, it is possible to generate user data by acquiring voice information and/or visual information for a user and analyzing personality or aptitude of the user by using artificial intelligence, and create an avatar of the user who are active in the metaverse using the user data.

According to the method for analyzing personality or aptitude based on a metaverse and artificial intelligence in accordance with exemplary embodiments of the present disclosure, it is possible to update personality or aptitude in real time depending on words or actions of an avatar created using initial user data in the metaverse.

According to the method for analyzing personality or aptitude based on a metaverse and artificial intelligence in accordance with exemplary embodiments of the present disclosure, it is possible to utilize an avatar reflecting personality or aptitude of a user in various fields, such as learning, communication, service offering, or corporate HR/recruitment of artificial intelligence for analyzing personality or aptitude.

What is claimed is:

1. A method for analyzing personality or aptitude based on a metaverse and artificial intelligence that is performed in a personality or aptitude analysis system, the method comprising:
    acquiring at least one of voice information, visual information, and biometric information for a user;
    analyzing personality or aptitude of the user by using at least one of the voice information, visual information, and biometric information;
    generating data for the user including a result of analyzing the personality or aptitude of the user; and
    creating an avatar of the user by using the data for the user, wherein using the voice information comprises:
        analyzing the voice information, wherein analyzing the voice information comprises:
            removing noise from the voice information to normalize the voice information;
            generating voice data to be marking on a timeline based on the voice information; and
            generating a voice style including at least one of a tempo, an idle time, a tone, and a volume based on the voice information;
        predicting the personality or aptitude of the user based on an analysis result of the voice information; and
        recommending the personality or aptitude of the user based on the prediction,
    wherein using visual information comprises:
        analyzing the visual information;
        predicting the personality or aptitude of the user based on an analysis result of the visual information; and
        recommending the personality or aptitude of the user based on the prediction, wherein analyzing visual information comprises:
            recognizing a face of the user in the visual information to crop the face of the user;
            generating face data to be marking on a timeline as one scene of a specific image or an entirety of the specific image based on the visual information; and
            generating a face style including at least one of a shape and size of the face, a shape and position of eyes, a shape and position of a nose, a shape and position of a mouth, a shape and position of ears, a shape and position of eyebrows, a facial expression, and a hairstyle, based on the visual information.

2. The method of claim 1, wherein the predicting of the personality or aptitude of the user based on the analysis result of the voice information comprises predicting the personality or aptitude of the user based on the voice data, and
    the personality or aptitude of the user is predicted by a first engine trained with training voice data classified for each personality or aptitude type, by using the voice data as an input.

3. The method of claim 1, wherein the predicting of the personality or aptitude of the user based on the analysis result of the voice information comprises predicting the personality or aptitude of the user based on the voice style, and
    the personality or aptitude of the user is predicted by a second engine trained with a training voice style classified for each personality or aptitude type, by using, as an input, an average value of the voice style for a specific part that is easy to read.

4. The method of claim 1, wherein the predicting of the personality or aptitude of the user based on the analysis result of the voice information comprises predicting the personality or aptitude of the user based on the voice style, and
    the personality or aptitude of the user is predicted by a third engine trained with marking specific data or continuous pattern data in a marking section, by using, as an input, the voice style marked in regular time intervals.

5. The method of claim 1, wherein the predicting of the personality or aptitude of the user based on the analysis result of the voice information comprises predicting the personality or aptitude of the user based on the voice data and the voice style, and
    the personality or aptitude of the user is predicted by statistically processing a result predicted based on the voice data and a result predicted based on the voice style.

6. The method of claim 1, wherein the predicting of the personality or aptitude of the user based on an analysis result of the visual information comprises predicting the personality or aptitude of the user based on the face data, and
    the personality or aptitude of the user is predicted by a fourth engine trained with training face data classified for each personality or aptitude type, by using the face data as an input.

7. The method of claim 1, wherein the predicting of the personality or aptitude of the user based on an analysis result of the visual information comprises predicting the personality or aptitude of the user based on the voice style, and
    the personality or aptitude of the user is predicted by a fifth engine trained with a training face style classified for each personality or aptitude type, by using, as an input, a 2D or 3D face pattern generated based on the face style in the one scene of the specific image that is easy to read.

8. The method of claim 1, wherein the predicting of the personality or aptitude of the user based on an analysis result of the visual information comprises predicting the personality or aptitude of the user based on the voice style, and
    the personality or aptitude of the user is predicted by a sixth engine trained with a training face style classified for each personality or aptitude type, by using, as an input, a 2D or 3D face pattern generated based on the face style marked by time for the entirety of the specific image.

9. The method of claim 1, wherein the predicting of the personality or aptitude of the user based on an analysis result of the visual information comprises predicting the personality or aptitude of the user based on the face data and the face style, and
    the personality or aptitude of the user is predicted by statistically processing a result predicted based on the face data and a result predicted based on the face style.

10. The method of claim 1, further comprising updating the user data including the result of analyzing the personality or aptitude of the user in real time or periodically by reflecting an action, a conversation, words, or writing of the created avatar in the metaverse.

11. The method of claim 1, further comprising analyzing at least one of interests and tendencies of the user using the avatar in consideration of words, a conversation, or writing used by the created avatar, and an action of the avatar in the metaverse together, from a perspective of multimodal behavior patterns, the action including movement of hands, a head, and a gaze of the avatar.

* * * * *